United States Patent
You et al.

(10) Patent No.: US 8,947,558 B2
(45) Date of Patent: Feb. 3, 2015

(54) DIGITAL PHOTOGRAPHING APPARATUS FOR MULTI-PHOTOGRAPHY DATA AND CONTROL METHOD THEREOF

(75) Inventors: Ju-yeon You, Seongnam-si (KR); Se-hyun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 383 days.

(21) Appl. No.: 13/303,306

(22) Filed: Nov. 23, 2011

(65) Prior Publication Data

US 2012/0182445 A1 Jul. 19, 2012

(30) Foreign Application Priority Data

Jan. 17, 2011 (KR) ........................ 10-2011-0004534

(51) Int. Cl.
  *H04N 5/76* (2006.01)
  *H04N 1/21* (2006.01)
  *H04N 1/00* (2006.01)
  *H04N 101/00* (2006.01)

(52) U.S. Cl.
  CPC ........... *H04N 1/212* (2013.01); *H04N 1/00411* (2013.01); *H04N 2101/00* (2013.01)
  USPC ..................................................... 348/231.2

(58) Field of Classification Search
  CPC ....... H04N 5/222; H04N 5/225; H04N 5/232; H04N 1/2116; H04N 1/2112; H04N 1/2125
  USPC ........... 348/220.1, 222.1, 231.2, 231.3, 231.4
  See application file for complete search history.

(56) References Cited

U.S. PATENT DOCUMENTS

| | | | |
|---|---|---|---|
| 6,871,010 B1 * | 3/2005 | Taguchi et al. | 386/230 |
| 7,171,626 B2 * | 1/2007 | Sheldon et al. | 715/810 |
| 7,193,646 B1 * | 3/2007 | Shioji | 348/220.1 |
| 7,409,645 B2 * | 8/2008 | Sheldon et al. | 715/810 |
| 7,411,623 B2 * | 8/2008 | Shibutani | 348/333.02 |
| 7,426,700 B2 * | 9/2008 | Sheldon et al. | 715/810 |
| 7,729,608 B2 * | 6/2010 | Okubo | 396/374 |
| 7,777,789 B2 * | 8/2010 | Shibuya et al. | 348/231.2 |
| 8,350,946 B2 * | 1/2013 | Jung et al. | 348/333.02 |
| 8,437,623 B2 * | 5/2013 | Ohnishi | 386/328 |
| 8,471,944 B2 * | 6/2013 | Nonaka et al. | 348/333.05 |
| 8,549,434 B2 * | 10/2013 | Ouzts et al. | 715/838 |
| 8,707,192 B2 * | 4/2014 | Robert et al. | 715/767 |
| 8,713,462 B2 * | 4/2014 | Robert et al. | 715/767 |
| 8,732,600 B2 * | 5/2014 | Robert et al. | 715/767 |
| 2003/0011681 A1 * | 1/2003 | Ohmura | 348/207.1 |
| 2003/0076322 A1 * | 4/2003 | Ouzts et al. | 345/440 |
| 2003/0156140 A1 * | 8/2003 | Watanabe | 345/810 |
| 2003/0197785 A1 * | 10/2003 | White et al. | 348/207.99 |

(Continued)

FOREIGN PATENT DOCUMENTS

EP 1 494 240 A2 1/2005

OTHER PUBLICATIONS

Search Report established for GB 1121717.1 (Jun. 25, 2012).

*Primary Examiner* — Nicholas Giles (74) *Attorney, Agent, or Firm* — Drinker Biddle & Reath LLP (57) ABSTRACT

A method of controlling a digital photographing apparatus includes obtaining first data and second data from a single event, storing the first and second data as multi-photography data, and generating a multi-photography folder that includes a first image corresponding to the first data and a second image corresponding to the second data.

17 Claims, 9 Drawing Sheets

(56) References Cited

U.S. PATENT DOCUMENTS

| | | | |
|---|---|---|---|
| 2003/0234804 A1* | 12/2003 | Parker et al. | 345/719 |
| 2004/0109062 A1* | 6/2004 | Yamaya | 348/207.1 |
| 2005/0268252 A1* | 12/2005 | Parker et al. | 715/810 |
| 2007/0061745 A1* | 3/2007 | Anthony et al. | 715/764 |
| 2007/0106675 A1 | 5/2007 | Watanabe et al. | |
| 2008/0034381 A1* | 2/2008 | Jalon et al. | 719/329 |
| 2008/0307343 A1* | 12/2008 | Robert et al. | 715/765 |
| 2008/0307363 A1* | 12/2008 | Jalon et al. | 715/835 |
| 2009/0115861 A1* | 5/2009 | Mochizuki | 348/220.1 |
| 2009/0180003 A1* | 7/2009 | Cho | 348/231.2 |
| 2010/0188527 A1 | 7/2010 | Onoda | |
| 2011/0029925 A1* | 2/2011 | Robert et al. | 715/830 |
| 2011/0035699 A1* | 2/2011 | Robert et al. | 715/783 |
| 2011/0041094 A1* | 2/2011 | Robert et al. | 715/810 |
| 2011/0043651 A1* | 2/2011 | Nonaka et al. | 348/220.1 |
| 2011/0055759 A1* | 3/2011 | Robert et al. | 715/825 |
| 2011/0173538 A1* | 7/2011 | Robert et al. | 715/720 |
| 2012/0002065 A1* | 1/2012 | Park et al. | 348/220.1 |

\* cited by examiner

DIGITAL PHOTOGRAPHING APPARATUS FOR MULTI-PHOTOGRAPHY DATA AND CONTROL METHOD THEREOF

CROSS-REFERENCE TO RELATED PATENT APPLICATIONS

This application claims the priority benefit of Korean Patent Application No. 10-2011-0004534, filed on Jan. 17, 2011, in the Korean Intellectual Property Office, the entire disclosure of which is incorporated herein by reference.

BACKGROUND

1. Field of the Invention

Embodiments relate to a digital photographing apparatus and a control method thereof.

2. Description of the Related Art

In general, in a reproduction mode, a digital photographing apparatus, such as a digital camera or a camcorder, displays an image or a moving picture stored in a recording medium on a display screen. Also, data related to photography, such as captured images, captured moving pictures, recorded voices and sounds, and geographic information regarding a photography location, may often be correlated.

SUMMARY

To solve the above and/or other problems, embodiments can provide a digital photographing apparatus capable of managing and reproducing various photography data obtained by one-time photography, and a control method thereof.

According to an embodiment, there is provided a method of controlling a digital photographing apparatus. The method includes obtaining first data and second data from a single event, storing the first and second data as multi-photography data, and generating a multi-photography folder that includes a first image corresponding to the first data and a second image corresponding to the second data.

The first and second data may be photography data of different types.

The single event may be an action to obtain data using the digital photographing apparatus.

The first image may include a first thumbnail corresponding to the first data, and the second image may include a second thumbnail corresponding to the second data.

The first image may include a first thumbnail indicating a photography type of the first data, and the second image may include a second thumbnail indicating a photography type of the second data.

The method may further include displaying the multi-photography folder, selecting the multi-photography folder, and reproducing the second data corresponding to the second image included in the multi-photography folder in a second area of a display screen while reproducing the first data corresponding to the first image included in the multi-photography folder in a first area of the display screen.

The method may further include displaying the multi-photography folder, selecting the first image, and reproducing the second data corresponding to the second image included in the multi-photography folder in a second area of a display screen while reproducing the first data corresponding to the first image included in the multi-photography folder in a first area of the display screen.

The method may further include displaying a first reproduction selection screen that includes at least the multi-photography folder, selecting the multi-photography folder, and displaying a second reproduction selection screen that includes the first image and the second image of the selected multi-photography folder, overlapping the first reproduction selection screen.

The method may further include reproducing the first data corresponding to the first image in a first area of the second reproduction selection screen, and reproducing the second data corresponding to the second image in a second area of the second reproduction selection screen.

The method may further include reproducing third data obtained by reducing the first data corresponding to the first image in a first area of the second reproduction selection screen, and reproducing fourth data obtained by reducing the second data corresponding to the second image in a second area of the second reproduction selection screen.

The first and second data may each be a different one selected from the group consisting of still image data, continuously photographed still image data, moving picture data, snap moving picture data, GPS data, sound data, and augmented reality data.

According to another embodiment, there is provided a method of controlling a digital photographing apparatus. The method includes displaying a first reproduction selection screen that includes at least one multi-photography folder that has first data and second data correlated to the first data, selecting the at least one multi-photography folder, and displaying a second reproduction selection screen that includes the first and second data included in the selected multi-photography folder, overlapping the first reproduction selection screen.

The method may further include reproducing third data obtained by reducing the first data in a first area of the second reproduction selection screen, and reproducing fourth data obtained by reducing the second data in a second area of the second reproduction selection screen.

The at least one multi-photography folder includes a first thumbnail of the first data, a second thumbnail indicating a photography type of the first data, a third thumbnail of the second data, and a fourth thumbnail indicating a photography type of the second data.

According to another embodiment, there is provided a digital photographing apparatus. The digital photographing apparatus includes a multi-photography data management unit that obtains first data and second data from a single event and stores the first and second data as multi-photography data, and a folder generation unit that generates a multi-photography folder that includes a first image corresponding to the first data and a second image corresponding to the second data.

The first and second data may be photography data of different types.

The single event may be an action to obtain data using the digital photographing apparatus.

The digital photographing apparatus may further include a reproduction controller that displays a first reproduction selection screen including at least one multi-photography folder, and when the multi-photography folder including the first image and the second image is selected, displays a second reproduction selection screen including the first and second images of the selected multi-photography folder, overlapping the first reproduction selection screen.

The reproduction controller may reproduce the first data corresponding to the first image in a first area of the second reproduction selection screen and may reproduce the second data corresponding to the second image in a second area of the second reproduction selection screen.

The reproduction controller may reproduce third data obtained by reducing the first data corresponding to the first image in a first area of the second reproduction selection screen and may reproduce fourth data obtained by reducing the second data corresponding to the second image in a second area of the second reproduction selection screen.

BRIEF DESCRIPTION OF THE DRAWINGS

The above and other features and advantages will become more apparent by describing in detail exemplary embodiments with reference to the attached drawings in which.

DETAILED DESCRIPTION

Embodiments are described in detail with reference to the accompanying drawings. However, embodiments are not limited thereto, and it will be understood that various changes in form and details may be made therein without departing from the spirit and scope of the following claims. That is, descriptions on particular structures or functions may be presented merely for explaining exemplary embodiments. In the following description, when detailed descriptions about related well-known functions or structures are determined to make the detailed description unclear, such detailed descriptions may be omitted.

The terms such as "first" and "second" are used herein merely to describe a variety of constituent elements, but the constituent elements are not limited by the terms. The terms are used only for the purpose of distinguishing one constituent element from another constituent element.

The terminology used herein is for the purpose of describing the particular embodiments and is not intended to be limiting of exemplary embodiments of the invention. Thus, the expression of singularity in the present specification includes the expression of plurality unless clearly specified otherwise in context. Also, the terms such as "include" or "comprise" may be construed to denote a certain characteristic, number, step, operation, constituent element, or a combination thereof, but may not be construed to exclude the existence of or a possibility of an additional one or more other characteristics, numbers, steps, operations, constituent elements, or combinations thereof.

Hereinafter, embodiments will be described in detail by explaining exemplary embodiments with reference to the attached drawings. Like reference numerals in the drawings denote like elements. A redundant description of like elements will be omitted herein.

Figure 1:
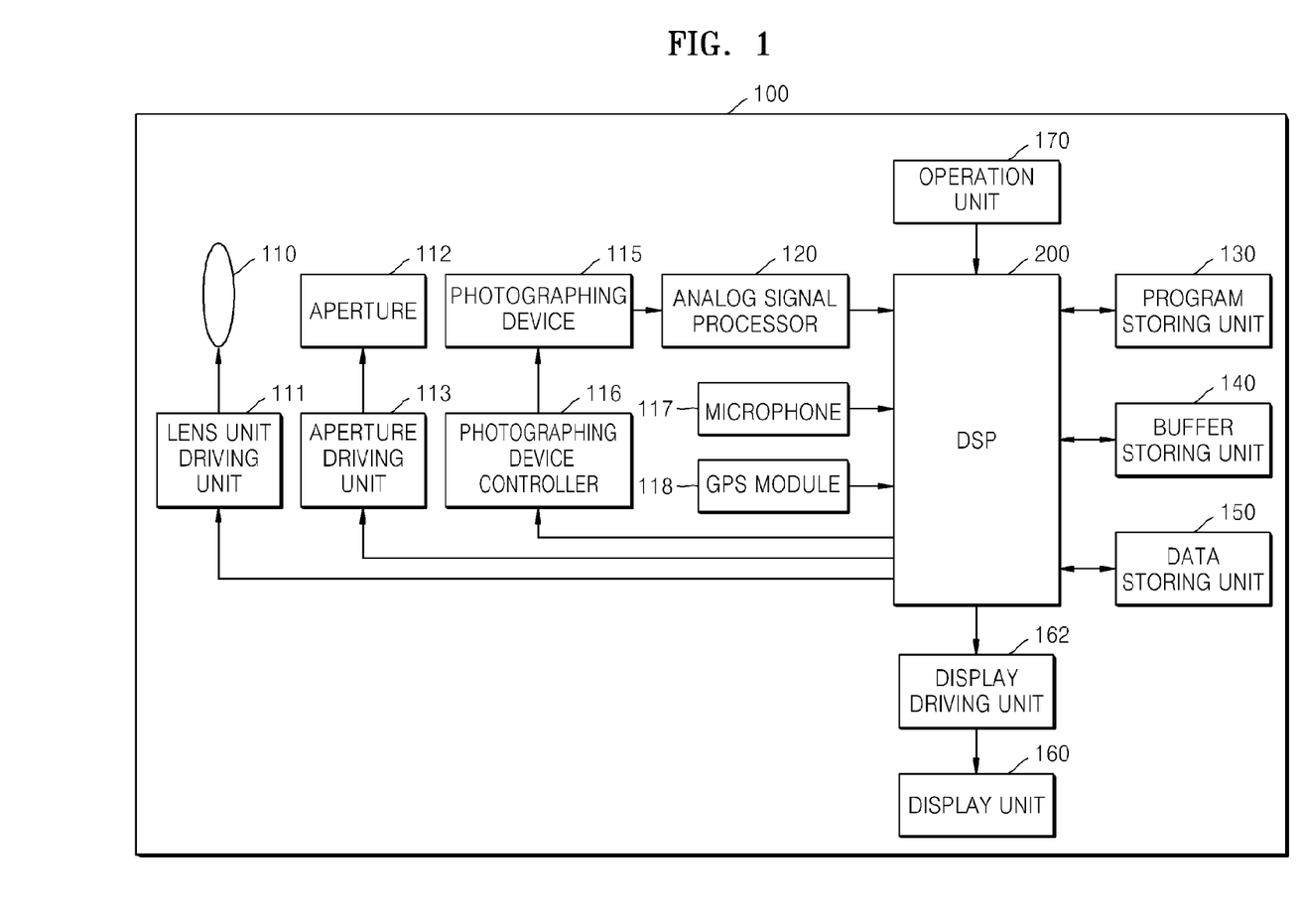
FIG. 1 schematically illustrates a digital photographing apparatus according to an embodiment.

FIG. 1 schematically illustrates a structure of a digital photographing apparatus according to an embodiment. A digital camera 100 is described below as an example of the digital photographing apparatus according to an embodiment. However, the digital photographing apparatus is not limited to the digital camera 100 of FIG. 1 and may be any of other digital apparatuses such as a camera phone, a personal digital assistant (PDA), a portable multimedia player (PMP), a camcorder, or some other device adapted to capture an image.

The digital photographing apparatus can obtain multi-photography data from one event. The one event can signify a one-time photographing operation, for example, an operation of pressing a shutter release once or an operation in which a shutter release is pressed once by a user. The multi-photography data can include at least one of various combinations of, for example, still image data and moving picture data, still image data and corresponding photographic position data, still image data and voice data obtained during corresponding photography, still image data, moving picture data, and augmented reality data about a corresponding photography place. For example, the digital photographing apparatus can store and can manage five still images captured in one minute and a one minute moving picture captured during the one minute together as multi-photography data. The digital photographing apparatus can manage multi-photography data obtained from one event in a single multi-photography folder and can display thumbnails in the multi-photography folder corresponding to photography types of the multi-photography data so that a user may easily identify the photography types of the multi-photography data. Also, when a multi-photography folder is selected, multi-photography data in the multi-photography folder can be instantly reproduced in separate reproduction areas so that the multi-photography data may be instantly identified and reproduced. The inconvenience in reproducing a complicated tree structure may also be reduced.

The digital camera 100 according to the present embodiment may include a lens unit 110, a lens unit driving unit 111, an aperture 112, an aperture driving unit 113, a photographing device 115, a photographing device controller 116, an analog signal processor 120, a program storing unit 130, a buffer storing unit 140, a data storing unit 150, a display driving unit 162, a display unit 160, a digital signal processor (DSP) 200, and an operation unit 170. The lens unit 110, the lens unit driving unit 111, the aperture 112, the aperture driving unit 113, the photographing device 115, the photographing device controller 116, and the analog signal processor 120 may be referred to as a photographing unit.

The lens unit 110 can focus an incident light. The lens unit 110 can include a zoom lens that can control a viewing angle that can be increased or decreased according to a focal length and a focus lens that can adjust a focus of an object. The zoom lens and the focus lens each may be formed of a single lens or a group of a plurality of lenses. The aperture 112 can adjust an amount of incident light according to a degree of opening thereof.

The lens unit driving unit 111 and the aperture driving unit 113 can receive a control signal from the DSP 200 and respectively can drive the lens unit 110 and the aperture 112. The lens unit driving unit 111 can adjust the focal length by controlling a position of a lens to perform operations of auto-focusing, zoom change, and focus change. The aperture driving unit 113 can adjust the degree of opening of the aperture 112 to perform operations of auto-focusing, auto-exposure correction, focus change, and adjustment of depth of field.

An incident light passing through the lens unit 110 can form an image of an object on a light receiving surface of the photographing device 115. The photographing device 115 may use a charge coupled device (CCD), a complementary metal oxide semiconductor image sensor (CIS), or a high speed image sensor that can convert an optical signal to an electric signal. A sensitivity of the photographing device 115 may be adjusted by the photographing device controller 116. The photographing device controller 116 may control the photographing device 115 according to a control signal that is automatically generated by an image signal that is inputted in real time or a control signal that is manually inputted by an operation of a user. An exposure time of the photographing device 115 can be adjusted by a shutter (not shown). The shutter can include a mechanical shutter that can adjust incidence of light by moving a blind and an electronic shutter that can control exposure by applying an electric signal to the photographing device 115.

The analog signal processor 120 can perform noise reduction processing, gain control, waveform shaping, and analog-digital conversion processing on an analog signal applied by the photographing device 115. A microphone 117 can capture external voice or sound, can convert the captured voice or sound into an electric signal, and can provide the electric signal to the DSP 200. The DSP 200 can process a received electric signal into voice data and can match the voice data with captured still image data or moving picture data.

A global positioning system (GPS) module 118 can receive a signal transmitted by a GPS satellite and can determine positional information. The GPS module 118 can provide the determined positional information to the DSP 200. The DSP 200 can process positional information into positional data and can match the positional data with captured still image data or moving picture data. The GPS module 118 can determine a position of the digital camera 100 by receiving signals transmitted by three or more GPS satellites. The position of the digital camera 100 can be determined by measuring a time gap between when a signal is transmitted by the GPS satellite and when the signal is received by the digital camera 100.

The operation unit 170 can be used to input an external control signal, for example, by a user. The operation unit 170 may include a shutter-release button that can input a shutter-release signal that can capture an image by exposing the photographing device 115 to light for a predetermined time, a power button that can input a control signal that can control on/off of power, a wide zoom button and a tele-zoom button that can increase or decrease a viewing angle according to an input, and a variety of function buttons that can select a mode such as a text input mode, a photographing mode, a reproduction mode, a white balance setting mode, or an exposure setting mode. The operation unit 170 may have a variety of types of buttons as above, but embodiments are not limited thereto. For example, the operation unit 170 may be embodied in any type such as a keyboard, a touch pad, a touch screen, or a remote controller, to be used by a user to input data.

The digital camera 100 can include a program storing unit 130 that can store a program such as an operation system that can drive the digital camera 100 or an application system, a buffer storing unit 140 that can temporarily store data needed for performing an operation or resultant data, and a data storing unit 150 that can store various information needed for the program, such as an image file having an image signal.

The digital camera 100 can include the display unit 160 that can display an operation state of the digital camera or still image data or moving picture data captured by the digital camera 100. The display unit 160 may provide visual information to a user. To provide visual information, the display unit 160 may include, for example, a liquid crystal display panel (LCD) or an organic light emitting display panel (OLED). The display driving unit 162 can provide a driving signal to the display unit 160.

The digital camera 100 can include the DSP 200, which can process input image signals and can control each element according to a processed input image signal or an external input signal. The DSP 200 may reduce noise of input image data and can perform image signal processing for improving image quality, such as gamma correction, color filter array interpolation, color matrix, color correction, or color enhancement. Also, the DSP 200 may generate an image file by compressing image data generated by performing the image signal processing for improving image quality, or restore image data from an image file. An image compression format may be a reversible format or an irreversible format. Compressed data may be stored in the data storing unit 150. Also, the DSP 200 may functionally perform sharpness processing, color processing, blur processing, edge emphasis processing, image interpretation processing, image recognition processing, or image effect processing. Face recognition or scene recognition processing may be performed as the image recognition processing. For example, luminance level control, color correction, contrast control, contour emphasis control, screen division processing, or character image generation and synthesis processing may also be performed.

Also, the DSP 200 may generate a control signal to control auto-focusing, zoom change, focus change, or auto-exposure correction by executing a program stored in the program storing unit 130 or using a separate module. The DSP 200 can provide a generated control signal to the lens unit driving unit 111, the aperture driving unit 113, and the photographing device controller 116, so that operations of elements, such as a shutter or a flash, provided in the digital camera 100 may be generally controlled.

Figure 2:
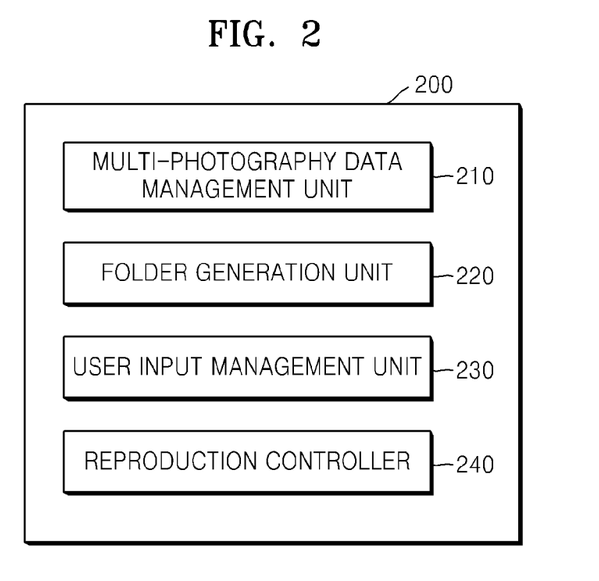
FIG. 2 is a block diagram of a digital signal processor of the digital photographing apparatus illustrated in FIG. 1.

FIG. 2 is a block diagram of the digital signal processor 200 of FIG. 1. Referring to FIG. 2, the DSP 200 can include a multi-photography data management unit 210, a folder generation unit 220, a user input management unit 230, and a reproduction controller 240. The DSP 200 can be referred to as a digital photographing apparatus.

In the present embodiment, the DSP 200 can manage different types of data captured from the same event and can reproduce first data in a first area and second data in a second area by dividing a display area of the display unit 160. The first area may be a main display area and the second area may be an auxiliary area, or vice versa. Data reproduced in the first area can be defined to be first data, and data reproduced in the second area can be defined to be second data. However, embodiments are not limited to only two types of data, and there may be three or more types of data. The first data and the second data can each be a different one selected from the group consisting of still image data, continuously captured still image data, moving picture data, snap moving picture data, GPS data, sound data, and augmented reality data. Embodiments are not limited to the above-described data types, and any other type of data may be employed.

The multi-photography data management unit 210 can store the first and second data obtained through the photographing device 115 as multi-photography data. The first and second data can be obtained from the same event. For example, the first and second data may be a one minute moving picture and five still images captured while capturing the one minute moving picture, five still images and GPS data about a place where the still images were captured, or one still image and augmented reality data about a place where the still image was captured. The multi-photography data management unit 210 can match the first and second data together as multi-photography data and can store the multi-photography data in a storage medium. The storage medium may be the data storing unit 150 of FIG. 1 or a detachable memory card (not shown).

When there is a request for reproduction of multi-photography data including first and second data, the multi-photography data management unit 210 can extract the first and second data from the storage medium. In a reproduction mode, when a user selects the first data, the multi-photography data management unit 210 can prepare for reproduction by loading the first data, which is selected by the user, and the second data, which is matched to the first data included in the multi-photography data, from the storage medium. The multi-photography data management unit 210 can manage two or more data of different types obtained from a one-time photographing action by matching the data to each other and extracting matched data when there is a request for reproduction of any one of the matched data.

Also, the multi-photography data management unit 210 can search the storage medium for data captured during capturing of first data. The reproduction controller 240 can control reproduction of data found by the multi-photography data management unit 210 as second data to be synchronized with reproduction of the first data. For example, when the first data is a still image and the second data is a moving picture, while the still image is reproduced in the first area, a frame corresponding to when the still image was captured can be searched for in the moving picture, and the moving picture may be reproduced starting from a searched frame in the second area. Also, when the first data is a plurality of still images and the second data is a moving picture, while the plurality of still images are reproduced in the first area in a slideshow format, frames corresponding to when the still images were captured can be searched for in the moving picture, and the moving picture may be reproduced in the second area starting from searched frames.

Also, when first data is a moving picture and second data is a still image, while the moving picture is reproduced in the first area, a still image corresponding to a frame of the moving picture can be reproduced in the second area. Alternatively, when the first data is a moving picture and the second data is a plurality of still images, while the moving picture is reproduced in the first area, the plurality of still images corresponding to frames of the moving picture may be reproduced in a slideshow format to correspond to reproduction of the corresponding frames of the moving picture.

The folder generation unit 220 can generate a multi-photography folder in relation to multi-photography data stored by the multi-photography data management unit 210. In detail, the folder generation unit 220 can generate a multi-photography folder including a first image corresponding to first data and a second image corresponding to second data. The first and second images may be thumbnails corresponding to the first and second data, or thumbnails indicating photography types of the first and second data. That is, the multi-photography folder may include icon images indicating different photography types or may include icon images indicating different photography types and corresponding thumbnails of corresponding data. Thus, the user may intuitively identify in the multi-photography folder what the multi-photography data are.

Figure 4:
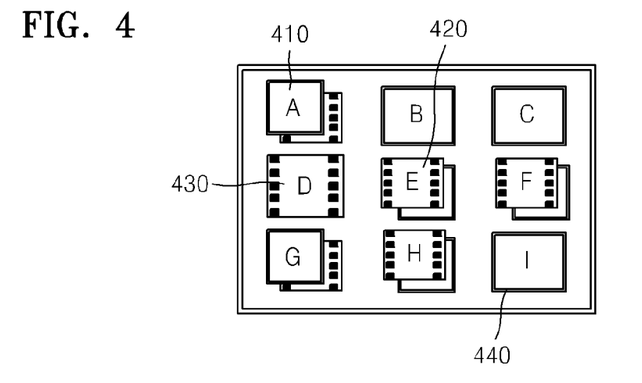
FIG. 4 illustrates a multi-photography folder according to an embodiment.
Figure 5A:
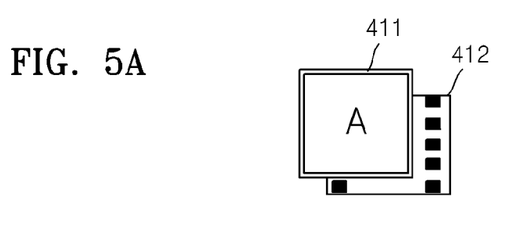
FIGS. 5A, 5B, 6A, 6B, 7A, 7B, 8A, and 8B illustrate multi-photography data of different types in the multi-photography folder illustrated in FIG. 4.
Figure 5B:
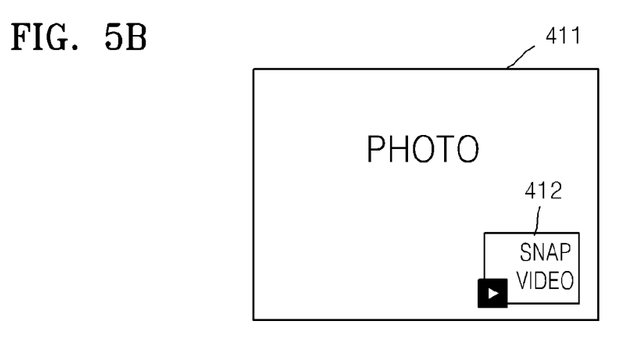

Referring to FIGS. 4, 5A, and 5B, various types of folders are illustrated. A folder A 410 can include a photo A 411 and a snap video A 412. The photo A 411 and the snap video A 412 can be stored and managed together as multi-photography data. As illustrated in FIG. 5A, the folder A 410 may be represented by a thumbnail indicating a still image photography type and a thumbnail indicating a snap moving picture photography type, or by these thumbnails and a thumbnail indicating the photo A 411 and a thumbnail indicating the snap video 412. As illustrated in FIG. 5B, when a user selects the folder A 410, the photo A 411 can be reproduced in the first area, that is, a main screen or a primary screen, and the snap video A 412 can be reproduced in the second area, that is, a sub-screen or an auxiliary screen. When the photo A 411 includes a plurality of photos, the user may drag the photo A 411 to the left or right to reproduce a next photo. Also, the user may select the snap video A 412 from a reproduction start menu to reproduce the snap video A 412 so that the snap video A 412 may be reproduced in the second area.

Figure 6A:
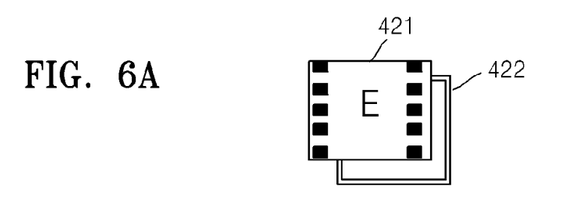
Figure 6B:
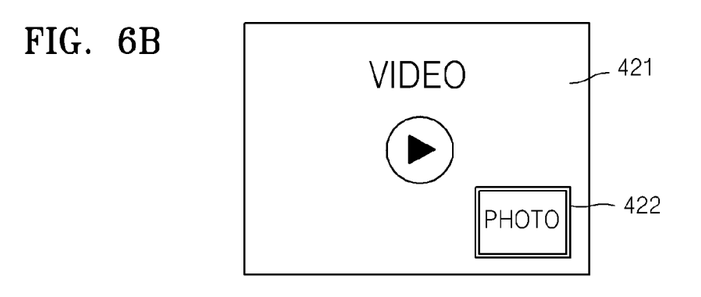
Figure 7A:
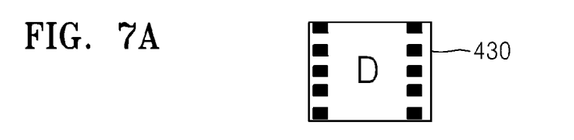
Figure 7B:
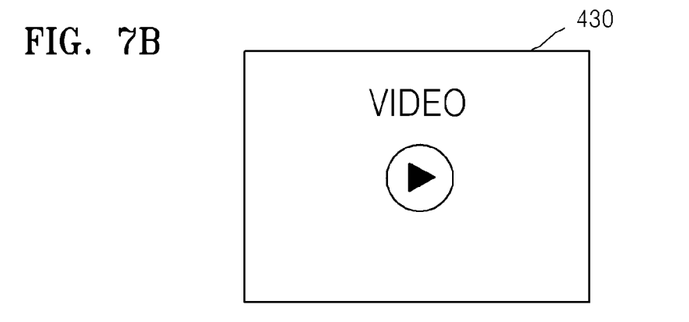
Figure 8A:
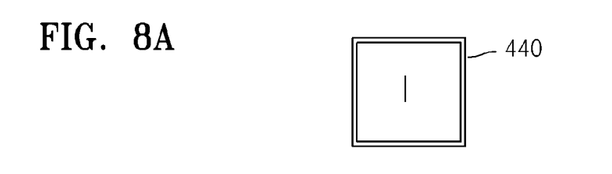
Figure 8B:
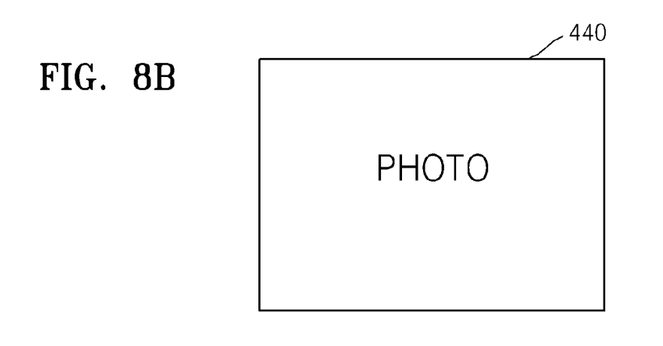

Referring to FIGS. 4, 6A, and 6B, a folder E 420 can include first data that is moving picture data and second data that is still image data. As illustrated in FIG. 6A, the folder E 420 may be represented by a thumbnail indicating a moving picture photography type and a thumbnail indicating a still image photography type, or by these thumbnails and a thumbnail indicating a moving picture E 421 and a thumbnail indicating a photo E 422. As illustrated in FIG. 6B, when a user selects the folder E 420, the moving picture E 421 can be reproduced in the first area, that is, a main screen or a primary screen, and the photo E 422 can be reproduced in the second area, that is, a sub-screen or an auxiliary screen. When the user selects the folder E 420, the moving picture E 421 and the photo E 422 as multi-photography data can be instantly reproduced, or the moving picture E 421 or the photo E 422 may be reproduced by selecting the moving picture E 421 or the photo E 422 from a reproduction start menu. Also, when the photo E 422 includes a plurality of photos taken when capturing the moving picture E 421, the plurality of photos may be reproduced sequentially or in a slideshow format according to reproduction of corresponding frames of the moving picture E 421.

In the present embodiment, since photography types may be easily identified at or before reproduction by a digital camera, multi-photography type data may be efficiently managed and reproduced. In comparison to a conventional technology, when a moving picture and a photo are captured together, the moving picture and the photo are separately searched for and are separately reproduced in a screen that reproduces the moving picture and a screen that reproduces the photo, respectively. Even when the moving picture and the photo are taken at the same event, it is difficult to correlate the moving picture and the photo with conventional technology. The moving picture and the photo can be arranged separate from each other, and thus the moving picture and the photo may not be viewed together at the same time with conventional technology.

According to an embodiment, as a multi-photography folder is represented in a thumbnail format, icons related to a thumbnail vary according to photography types so that photography types may be easily identified. Also, multi-photography data in the multi-photography folder may be instantly identified. Thus, for example, a search for and a reproduction of a moving picture and a photo in a multi-photography folder may not involve a complicated tree structure and may be performed in one step.

Referring to FIGS. 4, 7A-7B, and 8A-8B, a folder D 430 can include only a video D, whereas a folder 1440 can include only a photo 1440.

The user input management unit 230 can receive an input of a selection signal corresponding to a selection by a user. For example, the user input management unit 230 can receive a user's input for selecting a particular folder in a reproduction mode for reproducing data stored in the storage medium or a user's input for reproducing data of a particular folder. The user's selection may be performed by clicking the first area or the second area or by dragging from the first area to the second area or from the second area to the first area.

The reproduction controller 240 can reproduce first data in the first area of a display screen and second data corresponding to the first data in the second area of the display screen. For example, when the user selects a multi-photography folder displayed in a reproduction mode, the reproduction controller 240 can reproduce first data corresponding to a first image included in the multi-photography folder in the first area of a display screen and simultaneously can reproduce second data corresponding to a second image in the second area of the display screen. As another example, when the first data is a still image and the second data is a moving picture and the user selects the multi-photography folder, the still image can be reproduced in the first area of the display screen, that is, a main area, and the moving picture can be reproduced in the second area, that is, an auxiliary area.

Also, when the user selects the first image included in the multi-photography folder displayed in the reproduction mode, the first data corresponding to the first image can be reproduced in the first area of the display screen, and the second data corresponding to the second image can be reproduced in the second area of the display screen.

Also, when the user selects the multi-photography folder on a first reproduction selection screen including the multi-photography folder, a photo folder, and a moving picture folder, the DSP 200 can display a second reproduction selection screen including the first image and the second image of the multi-photography folder, overlapping the first reproduction selection screen. The reproduction controller 240 can reproduce the first data corresponding to the first image in the multi-photography folder in the first area of the second reproduction selection screen and the second data corresponding to the second image in the second area of the second reproduction selection screen. The first data and the second data reproduced in the second reproduction selection screen may be data obtained by reducing the first data and the second data.

Figure 3:
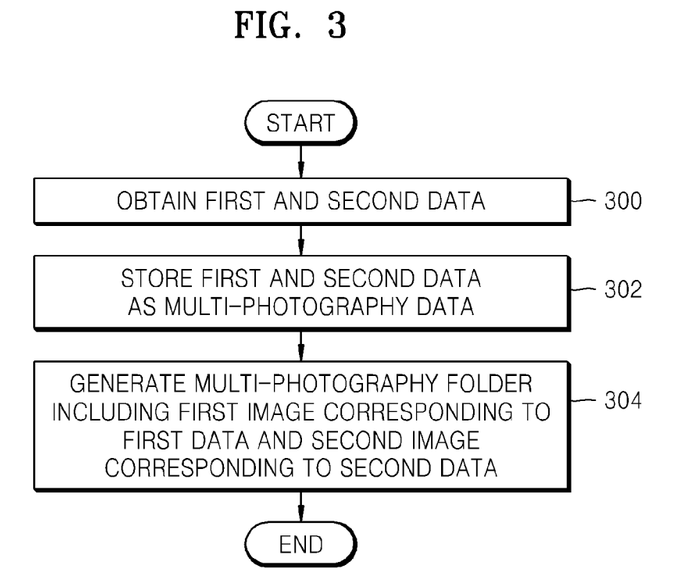
FIG. 3 is a flowchart for explaining a method of controlling a digital photographing apparatus, according to an embodiment.

FIG. 3 is a flowchart for explaining a method of controlling a digital photographing apparatus, according to an embodiment. Referring to FIG. 3, in Operation 300, first data and second data can be obtained. The first data and the second data can be multi-photography data obtained from the same event. The first data and the second data can be each a different one selected from the group consisting of still image data, continuously photographed still image data, moving picture data, snap moving picture data, GPS data, sound data, and augmented reality data. However, embodiments are not limited to the above-described data types, and other types of data may be employed. For example, the first data and the second data may be a one minute moving picture and five still images captured when capturing the one minute moving picture, five still images and GPS data about a place where the corresponding still images were captured, or one still image and augmented reality data about a place where the corresponding still image was captured.

In Operation 302, the first data and the second data can be stored as multi-photography data. That is, the first data and the second data obtained through multi-photography can be correlated and can be stored together in the storage medium. During reproduction, when the first data or the second data is selected, the first data and the second data can be reproduced according to the selection.

In Operation 304, a multi-photography folder including a first image corresponding to the first data and a second image corresponding to the second data can be generated. The first image can include a thumbnail corresponding to a photography type of the first data and/or a thumbnail obtained by reducing the first data. The second image can include a thumbnail corresponding to a photography type of the second data and/or a thumbnail obtained by reducing the second data. A thumbnail corresponding to a photography type is described below with reference to FIG. 10.

Figure 10:
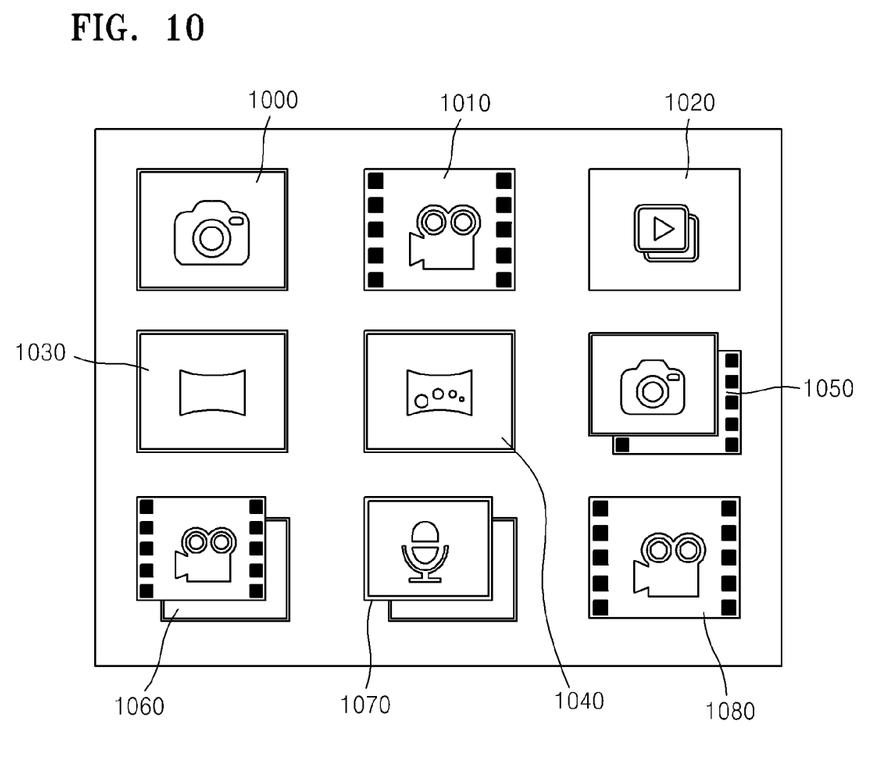
FIG. 10 illustrates a multi-photography folder including multi-photography data of different types according to another embodiment.

Referring to FIG. 10, thumbnails corresponding to multi-photography types are illustrated. A thumbnail 1000 can indicate a still image photography type. A thumbnail 1010 can indicate a moving picture photography type. A thumbnail 1020 can indicate a snap moving picture photography type. A thumbnail 1030 can indicate a sweep panorama photography type. A thumbnail 1040 can indicate an action panorama photography type. A thumbnail 1050 can indicate a still image photography type and a moving picture photography type. A thumbnail 1060 can indicate a moving picture photography type and a still image photography type. A thumbnail 1070 can indicate a sound photography type and a still image photography type. A thumbnail 1080 can indicate a moving picture photography type. However, the above thumbnails corresponding to photography types are mere examples. Embodiments are not limited thereto, and a variety of modifications may be employed.

Figure 9A:
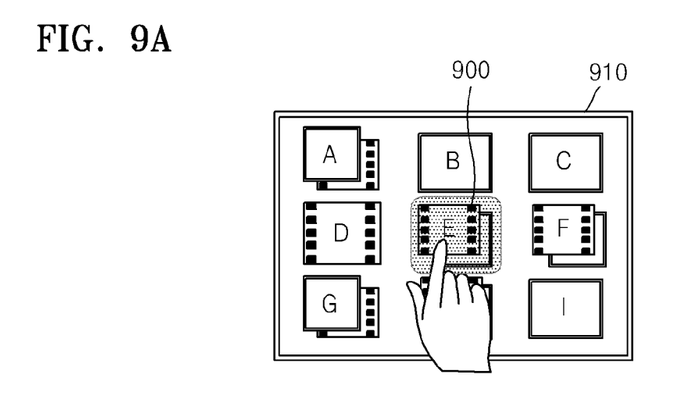
FIGS. 9A, 9B, 9C, 9D, and 9E illustrate a reproduction operation in a multi-photography folder, according to an embodiment.
Figure 9B:
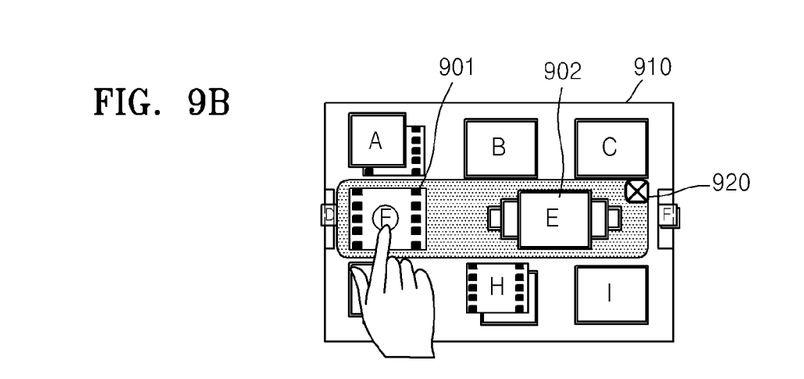

FIGS. 9A, 9B, 9C, 9D, and 9E illustrate a reproduction operation in a multi-photography folder, according to an embodiment. Referring to FIG. 9A, a reproduction selection screen 910 including folders A to I can be displayed, and a user can select a folder E 900. The selection by the user may be performed by clicking the folder E 900. The folders A to I can include general folders and multi-photography folders. The folder E 900 can be a multi-photography folder including a moving picture E 901 and a photo E 902, as shown in FIG. 9B.

Referring to FIG. 9B, a reproduction selection screen 920 of the folder E 900 can be displayed so as to select the moving picture E 901 or the photo E 902 in the folder E 900. The reproduction selection screen 920 can be displayed overlapping the reproduction selection screen 910. Although the reproduction selection screen 920 of the folder E 900 is described as overlapping the reproduction selection screen 910, embodiments are not limited thereto, and another embodiment may be employed, in which, for example, the reproduction selection screen 910 disappears and then the reproduction selection screen 920 of the folder E 900 can be displayed on an entire screen.

Referring back to FIG. 9B, the moving picture E 901 can be reproduced in a first area, that is, in a left area of the reproduction selection screen 920. In the reproduction selection screen 920 of the folder E 900, the user may select the moving picture E 901 to instantly reproduce the moving picture E 901. The moving picture E 901 may be data obtained by reducing data of the moving picture E 901. The photo E 902 reproduced in relation with the moving picture E 901 can be reproduced in a second area, that is, in a right area of the reproduction selection screen 920. The photo E 902 may include a plurality of photos captured while capturing the moving picture E 901. Although the left and right areas of the reproduction selection screen 920 in the folder E 900 are described as the first and second areas, the positions thereof are not limited thereto. The user may reproduce the multi-photography data in the folder E 901 in a state in which the reproduction selection screen 920 of the folder E is displayed.

Figure 9C:
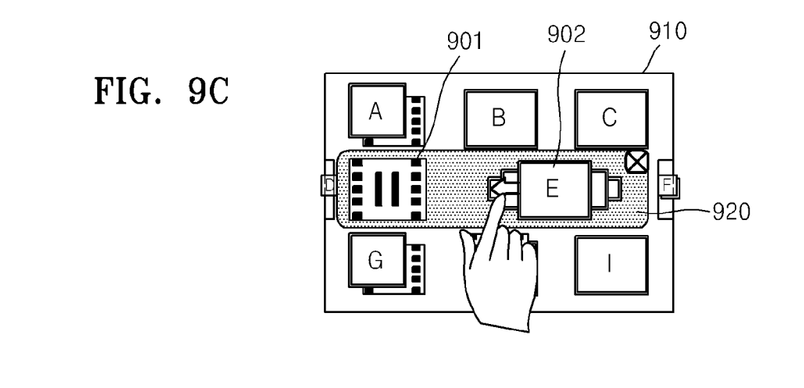
Figure 9D:
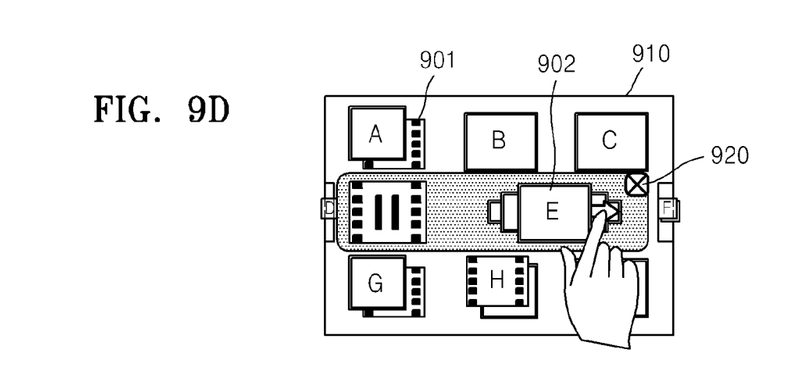

Referring to FIGS. 9C and 9D, while the moving picture E 901 is reproduced, the user may search for the photo E 902. The user may conduct a search by dragging the photo E 902 to the left or right. Although it is described that the user conducts a search by dragging the photo E 902 to the left or right, embodiments are not limited thereto, and photos E, for example, photos E-1, E-2, and E-3, may be reproduced sequentially or in a slideshow format according to reproduction of corresponding frames of the moving picture E901.

Figure 9E:
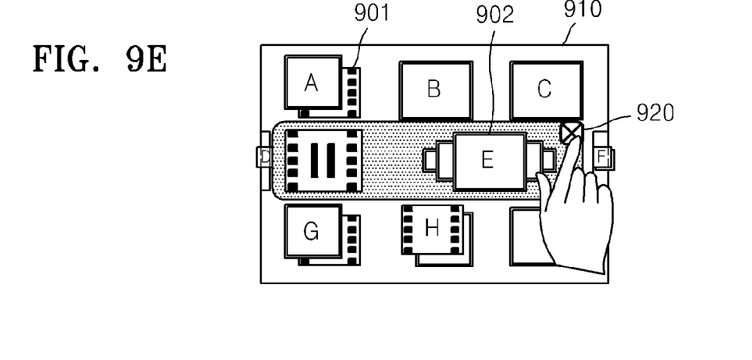

In FIG. 9E, the user can terminate the reproduction selection screen 920 of the folder E 900. According to the user's termination selection, the reproduction selection screen 920 can be closed, and the reproduction selection screen 910 can be redisplayed.

Figure 11:
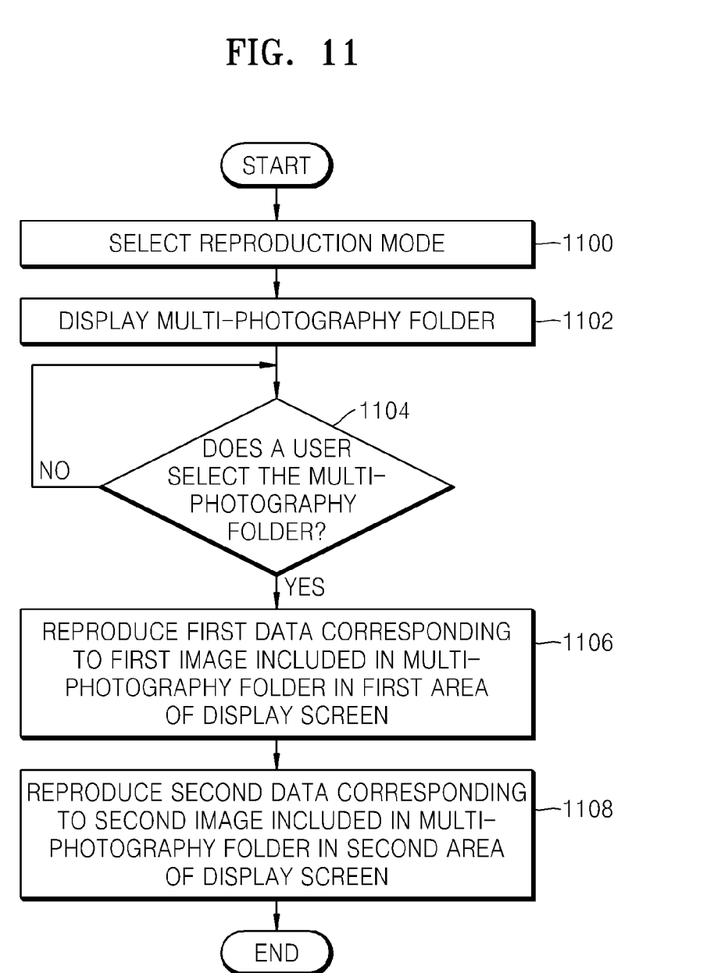
FIG. 11 is a flowchart for explaining a method of controlling a digital photographing apparatus, according to another embodiment.

FIG. 11 is a flowchart for explaining a method of controlling a digital photographing apparatus, according to another embodiment. Referring to FIG. 11, in Operation 1100, a reproduction mode can be selected. In Operation 1102, a multi-photography folder including a first image and a second image can be displayed. The first image can correspond to first data, and the second image can correspond to second data. The first image and the second image can be thumbnails indicating photography types of the first data and the second data or thumbnails obtained by reducing the first data and the second data, and the first data and the second data can be stored as multi-photography data. When a user selects the multi-photography folder in Operation 1104, the first data corresponding to the first image included in the multi-photography folder can be reproduced in a first area of a display screen in Operation 1106.

In Operation 1108, the second data corresponding to the second image included in the multi-photography folder can be reproduced in a second area of the display screen. Although the reproduction of the first data and the reproduction of the second data are separately performed in different operations, the reproduction of the first and second data may be concurrently performed.

Figure 12:
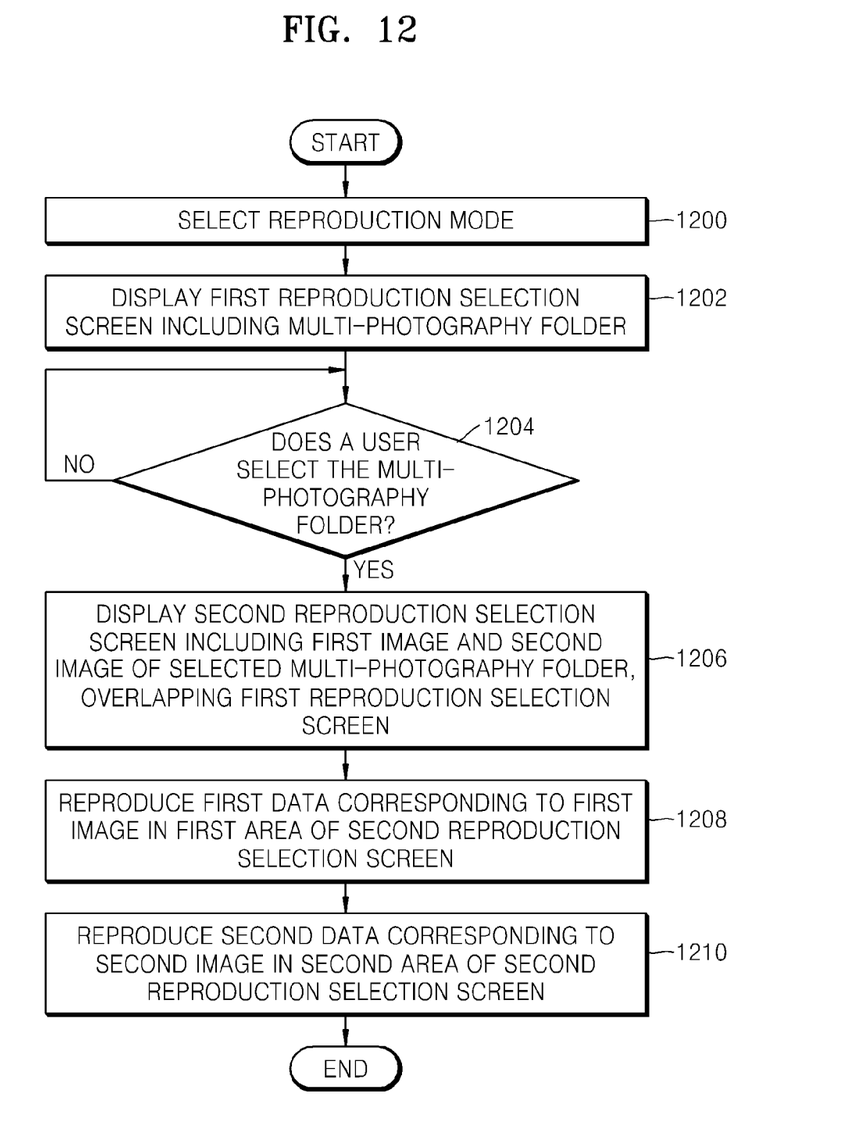
FIG. 12 is a flowchart for explaining a method of controlling a digital photographing apparatus, according to another embodiment.

FIG. 12 is a flowchart for explaining a method of controlling a digital photographing apparatus, according to another embodiment. Referring to FIG. 12, in Operation 1200, a reproduction mode is selected. In Operation 1202, a first reproduction selection screen including multi-photography folders can be displayed. Although the reproduction selection screen is described as a folder type screen, embodiments are not limited thereto, and the reproduction selection screen may be a thumbnail type or a file number type. In this case, the reproduction selection screen may be a type representing multi-photography data.

When a user selects a particular multi-photography folder in Operation 1204, a second reproduction selection screen including a first image and a second image of the multi-photography folder selected by the user can be displayed overlapping the first reproduction selection screen. The first and second images may be thumbnails indicating photography types of multi-photography data, or thumbnails obtained by reducing the multi-photography data. The second reproduction selection screen can be a menu provided for the user to select data to be reproduced in the multi-photography folder selected by the user.

In Operation 1208, first data corresponding to the first image can be reproduced in a first area of the second reproduction selection screen. In Operation 1210, second data corresponding to the second image can be reproduced in a second area of the second reproduction selection screen.

In a method of controlling a digital photographing apparatus according to another embodiment, since different types of data obtained simultaneously during photography may be reproduced together on the same screen, effective reproduction and management of multi-photography data may be possible.

The apparatus described herein may comprise a processor, a memory for storing program data to be executed by the processor, a permanent storage such as a disk drive, a communications port for handling communications with external devices, and user interface devices, such as a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by a computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Also, using the disclosure herein, programmers of ordinary skill in the art to which the invention pertains can easily implement functional programs, codes, and code segments for making and using the invention. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprises," "comprising," "includes," "including," "has," and "having," as used herein, are specifically intended to be read as open-ended terms of art.

The use of the terms "a" and "an" and "the" and similar referents in the context of describing the invention (especially in the context of the following claims) are to be construed to cover both the singular and the plural, unless the context clearly indicates otherwise. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

As described above, according to the digital photographing apparatus according to the embodiments and a control method thereof, since data captured by a user at one event can be intuitively identified, multi-photography data of a variety of photography modes may be effectively managed and reproduced.

Also, since contents of different types such as images and moving pictures, or images and sounds, can be viewed, more detailed and vivid memory about a corresponding scene may be enjoyed.

While this invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the following claims, and all differences within the scope will be construed as being included in the invention.

What is claimed is:

1. A method of controlling a digital photographing apparatus, the method comprising:
   obtaining first data, and obtaining second data while obtaining the first data;
   storing the first and second data associated as multi-photography data, together in a storage medium; and
   generating a multi-photography folder for the multi-photography data with an icon having a first image corresponding to the first data and a second image corresponding to the second data;
   wherein the icon of the multi-photography folder includes a first thumbnail of the first data, a second thumbnail indicating a photography type of the first data, a third thumbnail of the second data, and a fourth thumbnail indicating a photography type of the second data.

2. The method of claim 1, wherein the first and second data are photography data of different types.

3. The method of claim 1, wherein the first image comprises a first thumbnail corresponding to the first data, and the second image comprises a second thumbnail corresponding to the second data.

4. The method of claim 1, wherein the first image comprises a first thumbnail indicating a photography type of the first data and the second image comprises a second thumbnail indicating a photography type of the second data.

5. The method of claim 1, further comprising:
   displaying the icon of the multi-photography folder;
   selecting the multi-photography folder; and
   reproducing the second data corresponding to the second image included in the multi-photography folder in a second area of a display screen while reproducing the first data corresponding to the first image included in the multi-photography folder in a first area of the display screen.

6. The method of claim 1, further comprising:
   displaying the icon of the multi-photography folder;
   selecting the first image; and
   reproducing the second data corresponding to the second image included in the multi-photography folder in a second area of a display screen while reproducing the first data corresponding to the first image included in the multi-photography folder in a first area of the display screen.

7. The method of claim 1, further comprising:
   displaying a first reproduction selection screen comprising at least the icon of the multi-photography folder;
   selecting the multi-photography folder; and
   displaying a second reproduction selection screen comprising the first image and the second image of the selected multi-photography folder, overlapping the first reproduction selection screen.

8. The method of claim 7, further comprising:
   reproducing the first data corresponding to the first image in a first area of the second reproduction selection screen; and
   reproducing the second data corresponding to the second image in a second area of the second reproduction selection screen.

9. The method of claim 7, further comprising:
   reproducing third data obtained by reducing the first data corresponding to the first image in a first area of the second reproduction selection screen; and
   reproducing fourth data obtained by reducing the second data corresponding to the second image in a second area of the second reproduction selection screen.

10. The method of claim 1, wherein the first and second data are each a different one selected from the group consisting of still image data, continuously photographed still image data, moving picture data, snap moving picture data, GPS data, sound data, and augmented reality data.

11. A method of controlling a digital photographing apparatus, the method comprising:
    displaying a first reproduction selection screen comprising at least one icon of a multi-photography folder that comprises first data and second data correlated to the first data, wherein the first data and the second data are stored together in a storage medium in the multi-photography folder, wherein the icon comprises a first image corresponding to the first data and a second image corresponding to the second data;

selecting the at least one multi-photography folder; and displaying a second reproduction selection screen comprising the first and second data included in the selected multi-photography folder, overlapping the first reproduction selection screen;

wherein the at least one icon of the multi-photography folder includes a first thumbnail of the first data, a second thumbnail indicating a photography type of the first data, a third thumbnail of the second data, and a fourth thumbnail indicating a photography type of the second data.

12. The method of claim 11, further comprising:

reproducing third data obtained by reducing the first data in a first area of the second reproduction selection screen; and reproducing fourth data obtained by reducing the second data in a second area of the second reproduction selection screen.

13. A digital photographing apparatus comprising:

a multi-photography data management unit that obtains first data, and obtains second data while obtaining the first data and stores the first and second data associated as multi-photography data, together in a storage medium; and a folder generation unit that generates a multi-photography folder for the multi-photography data with an icon that comprises a first image corresponding to the first data and a second image corresponding to the second data;

wherein the icon of the multi-photography folder includes a first thumbnail of the first data, a second thumbnail indicating a photography type of the first data, a third thumbnail of the second data, and a fourth thumbnail indicating a photography type of the second data.

14. The digital photographing apparatus of claim 13, wherein the first and second data are photography data of different types.

15. The digital photographing apparatus of claim 13, further comprising a reproduction controller that displays a first reproduction selection screen comprising at least the icon of the multi-photography folder, and when the multi-photography folder is selected, displays a second reproduction selection screen comprising the first and second data of the selected multi-photography folder, overlapping the first reproduction selection screen.

16. The digital photographing apparatus of claim 15, wherein the reproduction controller reproduces the first data corresponding to the first image in a first area of the second reproduction selection screen, and reproduces the second data corresponding to the second image in a second area of the second reproduction selection screen.

17. The digital photographing apparatus of claim 15, wherein the reproduction controller reproduces third data obtained by reducing the first data corresponding to the first image in a first area of the second reproduction selection screen, and reproduces fourth data obtained by reducing the second data corresponding to the second image in a second area of the second reproduction selection screen.

* * * * *